United States Patent
Moldoveanu et al.

(10) Patent No.: US 7,961,549 B2
(45) Date of Patent: Jun. 14, 2011

(54) ENHANCING THE ACQUISITION AND PROCESSING OF LOW FREQUENCIES FOR SUB-SALT IMAGING

(75) Inventors: Nicolae Moldoveanu, Houston, TX (US); Philip A. F. Christie, Fen Drayton, Cambridgeshire (GB); Mark Egan, Sugarland, TX (US)

(73) Assignee: WesternGeco L.L.C., Houston, TX (US)

( * ) Notice: Subject to any disclaimer, the term of this patent is extended or adjusted under 35 U.S.C. 154(b) by 1116 days.

(21) Appl. No.: 11/568,531

(22) PCT Filed: Jun. 16, 2004

(86) PCT No.: PCT/US2004/018971
§ 371 (c)(1),
(2), (4) Date: Oct. 31, 2006

(87) PCT Pub. No.: WO2005/111656
PCT Pub. Date: Nov. 24, 2005

(65) Prior Publication Data
US 2008/0011540 A1    Jan. 17, 2008

(51) Int. Cl.
*G01V 1/38* (2006.01)
(52) U.S. Cl. ............ 367/20; 367/15; 367/130; 367/144; 367/153
(58) Field of Classification Search ............... 367/15, 367/20, 144, 153
See application file for complete search history.

(56) References Cited

U.S. PATENT DOCUMENTS

| | | |
|---|---|---|
| 3,744,021 A | 7/1973 | Todd |
| 4,493,061 A | 1/1985 | Ray |
| 4,648,080 A | 3/1987 | Hargreaves |
| 4,739,858 A | 4/1988 | Dragoset |
| RE032,683 E | 5/1988 | Ray |
| 4,757,482 A | 7/1988 | Fiske |
| 4,813,026 A | 3/1989 | Quaglino |
| 4,868,794 A | 9/1989 | Ziolkowski |
| 4,992,990 A | 2/1991 | Langeland et al. |
| 5,142,498 A | 8/1992 | Duren |
| 5,148,406 A | 9/1992 | Gateman |

(Continued)

FOREIGN PATENT DOCUMENTS
EP    0320073 A2    6/1989
(Continued)

OTHER PUBLICATIONS

White, et al. iSIMM pushes frontiers of marine seismic acquisition. First Break, vol. 20, Dec. 2002.*

(Continued)

*Primary Examiner* — Jack Keith
*Assistant Examiner* — Daniel L Murphy (57) ABSTRACT

A method and apparatus for acquiring seismic signals from beneath a salt region in the earth. In one embodiment, the method includes tuning an air gun array to a first bubble oscillation; towing the air gun array in the water at a depth of at least 10 meters, in which the air gun array has a total volume in a range of about 6780 cubic inches to about 10,170 cubic inches; directing acoustic signals with the air gun array down through the water into the earth beneath the salt region; towing one or more seismic streamers in the water at one or more depths, in which at least one of the depths is at least 10 meters, in which each streamer comprises a plurality of hydrophones disposed therealong; and recording with the hydrophones seismic signals reflected from strata in the earth beneath the salt region.

26 Claims, 7 Drawing Sheets

U.S. PATENT DOCUMENTS

| | | | |
|---|---|---|---|
| 5,281,773 A | 1/1994 | Duren | |
| 5,924,049 A | 7/1999 | Beasley et al. | |
| 5,995,452 A | 11/1999 | Bouyoucus | |
| 6,493,636 B1 | 12/2002 | Dekok | |
| 6,671,223 B2 | 12/2003 | Bittleston | |
| 6,961,284 B2 | 11/2005 | Moldoveanu | |
| 7,577,060 B2 | 8/2009 | Toennessen et al. | |
| 2002/0126575 A1* | 9/2002 | Bittleston | 367/19 |
| 2003/0067842 A1* | 4/2003 | Sukup et al. | 367/20 |

FOREIGN PATENT DOCUMENTS

| | | |
|---|---|---|
| GB | 2 141 824 | 1/1985 |
| GB | 2 342 081 | 4/2000 |
| WO | WO 0020895 A1 | 4/2000 |
| WO | 01016621 | 3/2001 |

OTHER PUBLICATIONS

Avedik, "Single bubble air-gun array for deep exploration," *Geophysics*, 58(3):366-382, 1993.

Lunnon, "An evaluation of peak and bubble tuning in sub-basalt imaging: modeling and results," *65th Mtg. Europ. Assn. Geosci. Eng.*, Paper C01, 2003.

Ziolkowski, "The signature of an air-gun array-computation from near-field measurements including interactions," *Geophysics*, 47:1413-1421, 1982.

Ziolkowski, "The use of low frequency for sub-basalt imaging," *71st Ann. Intern. Mtg. SEG*, pp. 74-77, 2001.

* cited by examiner

ENHANCING THE ACQUISITION AND PROCESSING OF LOW FREQUENCIES FOR SUB-SALT IMAGING

BACKGROUND OF THE INVENTION

1. Field of the Invention

Embodiments of the present invention generally relate to marine seismic surveying, and more preferably, to methods for acquiring seismic data.

2. Description of the Related Art

Seismic exploration is widely used to locate and/or survey subterranean geological formations for hydrocarbon deposits. Since many commercially valuable hydrocarbon deposits are located beneath bodies of water, various types of marine seismic surveys have been developed. In a typical marine seismic survey, seismic streamers are towed behind a survey vessel. The seismic streamers may be several thousand meters long and contain a large number of sensors, such as hydrophones, geophones, and associated electronic equipment, which are distributed along the length of the each seismic streamer cable. The survey vessel also includes one or more seismic sources, such as air guns and the like.

As the seismic streamers are towed behind the survey vessel, acoustic signals, commonly referred to as "shots," produced by the one or more seismic sources are directed down through the water into strata beneath the water bottom, where they are reflected from the various subterranean geological formations. Reflected signals are received by the sensors, digitized, and then transmitted to the survey vessel. The digitized signals are referred to as "traces" and are recorded and at least partially processed by a signal processing unit deployed on the survey vessel. The ultimate aim of this process is to build up a representation of the subterranean geological formations beneath the streamers. Analysis of the representation may indicate probable locations of hydrocarbon deposits in the subterranean geological formations.

Many of the subterranean geological formations are better represented with low frequency seismic signals. Accordingly, a need exists in the art for one or more methods for acquiring seismic signals from subterranean geological formations that are better represented with low frequency seismic signals.

SUMMARY OF THE INVENTION

One or more embodiments of the invention are directed to a method for acquiring seismic signals. In one embodiment, the method includes: towing one or more air gun arrays in the water at one or more first depths, in which at least one of the first depths is at least 10 meters; directing acoustic signals with the one or more air gun arrays down through the water into the earth beneath a salt region, towing one or more seismic streamers in the water at one or more second depths, in which at least one of the second depths is at least 10 meters, in which each streamer comprises a plurality of hydrophones disposed therealong; and recording with the hydrophones the seismic signals reflected from strata in the earth beneath the salt region.

One or more embodiments of the invention are also directed to a method for acquiring seismic signals from beneath a salt region in the earth. In one embodiment, the method includes tuning an air gun array to a first bubble oscillation, towing the air gun array in the water at a depth of at least 10 meters, in which the air gun array has a total volume in a range of about 6780 cubic inches to about 10,170 cubic inches; directing acoustic signals with the air gun array down through the water into the earth beneath the salt region; towing one or more seismic streamers in the water at one or more depths, in which at least one of the depths is at least 10 meters, in which each streamer comprises a plurality of hydrophones disposed therealong; and recording with the hydrophones the seismic signals reflected from strata in the earth beneath the salt region.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
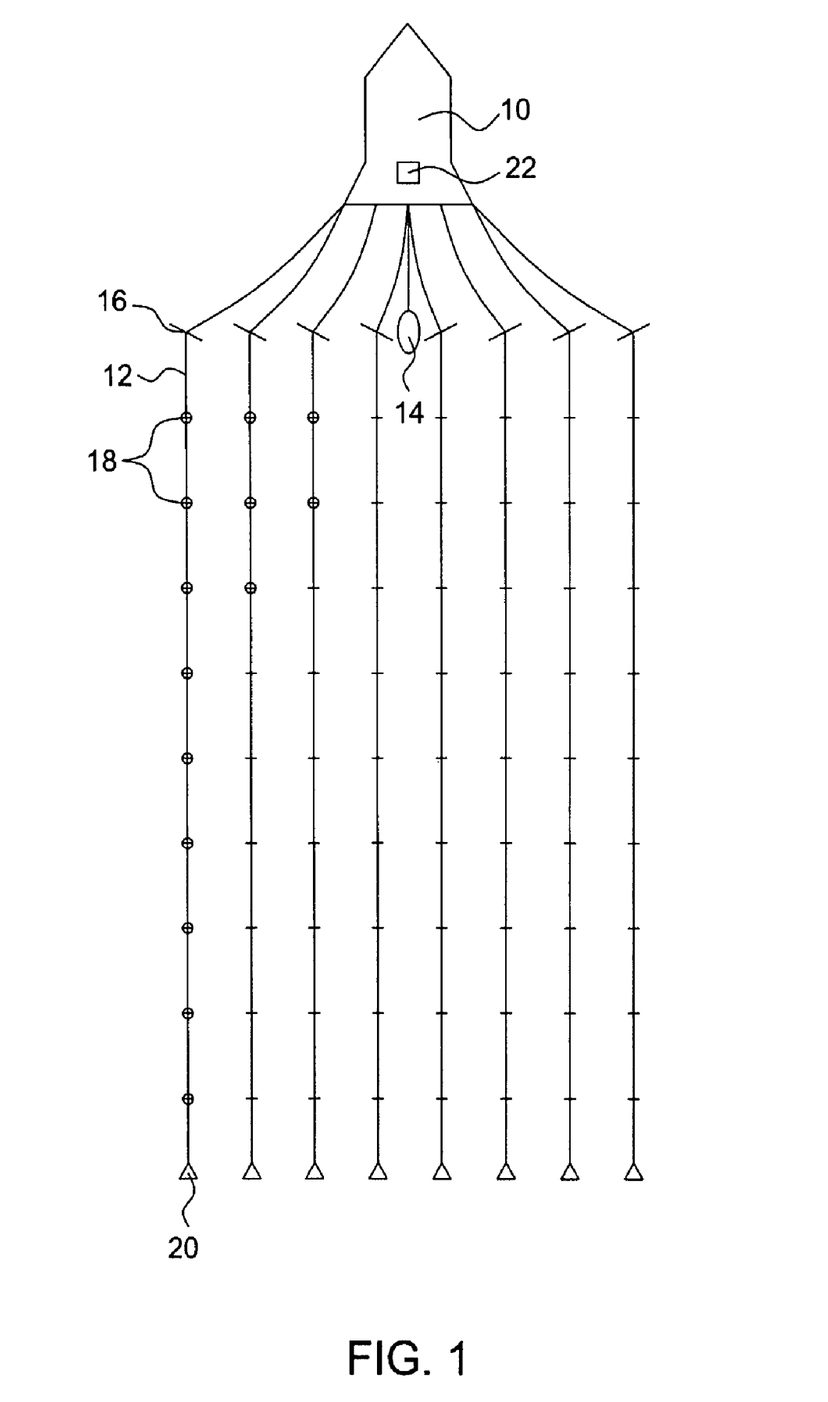
FIG. 1 illustrates a seismic survey vessel that may be used to acquire seismic data in accordance with one embodiment of the invention.

FIG. 1 illustrates a seismic survey vessel 10 that may be used to acquire seismic data in accordance with one embodiment of the invention. The seismic survey vessel 10 is shown towing an array of air guns 14. The seismic survey vessel 10 is also shown towing an array of eight seismic streamers 12. Each streamer 12 may be 6000 meters in length. The outermost streamers 12 in the array could be 700 meters apart, resulting in a horizontal separation of 100 meters between each streamer.

The air gun array 14 is comprised of air guns of varying sizes. The total volume of the air gun array 14 is 6000 cubic inches or greater. In one embodiment, the total volume of the air gun array 14 is in a range between 6780 to 10,170 cubic inches. In another embodiment the total volume of the air gun array 14 is 8475 cubic inches. Air gun arrays with larger volumes generally allow greater penetration beneath the salt region. The air gun array 14 used in connection with various embodiments of the invention may include various types of air guns, such as Bolt LL guns, GI injector guns and the like. Although various embodiments of the invention are described with reference to air guns, other types of emitters, such as marine vibrator units, are also contemplated by the invention.

The air gun array 14 may also be tuned to the first bubble oscillation. Tuning the air gun array 14 to the first bubble oscillation includes staggering the firing of each air gun within the array so that the first bubble oscillations generated by the air guns coincide, thereby emitting a source signature having high amplitudes at low frequencies. The period of the bubble emitted from each air gun depends on the volume of that air gun. For instance, air guns with small volumes emit bubbles with short periods. Accordingly, by appropriately staggering the firing of each air gun with a delay, the first bubble oscillations from all of the air guns within the air gun array 14 can be coordinated to occur at the same time. The air guns may be fired with delays that increase with decreasing air gun volume. The firings of the air guns may be staggered according to various techniques from commonly assigned U.S. Pat. No. 4,739,858, issued to Dragoset, Jr., which is incorporated herein by reference. In another embodiment, the air gun array 14 may be tuned to the leading peak. As such, the air guns are fired simultaneously to enhance the primary pulse and to minimize the bubble reverberation by destructive interference, thereby producing a seismic source signal having high amplitudes at high frequencies.

As a result of tuning the air gun array 14 to the first bubble oscillation, the source signature of the air gun array 14 may contain a mixed phase spectrum, which necessitates deterministic deconvolution to shape the source signature during processing. Deterministic deconvolution, however, may require the source signature of the air gun array 14 to be determined. The source signature of the air gun array 14 may be determined by first positioning a set of hydrophones adjacent the air guns but spaced therefrom by a distance such that none of the hydrophones penetrates the air bubbles produced by the air guns. Then, the emitted pressure wave in the near field of the air gun array at n independent points whose positions are known with respect to the air gun array is measured. The measurements are then processed by taking into account the interactions between the air guns to construct at least notionally an equivalent array of n non-interacting independent sources having n equivalent signatures which are superposable to provide the source signature of the air gun array 14. The source signature of the air gun array 14 is then determined by superposing the n equivalent signatures. In one embodiment, the source signature of the air gun array is the far field source signature of the air gun array. The above referenced process may be described in further detail in U.S. Pat. No. 4,868,794 issued to Ziolkowski et al., which is incorporated herein by reference. The source signature of the air gun array may then be used to design a designature operator on a shot by shot basis. In one embodiment, the air gun array diagnostics, such as, the firing time of each air gun, the depth of each air gun and the like, are recorded for each shot. The source signature of the air gun array 14 may then be computed using the air gun array diagnostics and a source signature computer modeling program, as commonly known by ordinary persons skilled in the art.

With regards to the streamers 12, each streamer 12 includes a deflector 16 at a front portion and a tail buoy 20 at a rear portion. The deflector 16 is used to horizontally position the end of the streamer 12 nearest the seismic survey vessel 10 and the tail buoy 20 is used to create a drag at the end of the streamer 12 farthest from the seismic survey vessel 10. The tension created on the seismic streamer 12 by the deflector 16 and the tail buoy 20 results in the roughly linear shape of the seismic streamer 12 shown in FIG. 1.

A plurality of streamer positioning devices 18, known as birds, is positioned between the deflector 16 and the tail buoy 20. Preferably, the positioning devices 18 are both vertically and horizontally steerable. These positioning devices 18 may, for instance, be located at regular intervals along the streamer 12, such as every 200 to 400 meters. The vertically and horizontally positioning devices 18 can be used to constrain the shape of the seismic streamer 12 between the deflector 16 and the tail buoy 20 in both the vertical (depth) and horizontal directions. A control system for the positioning devices 18 is distributed between a global control system 22 located on or near the seismic survey vessel 10 and a local control system 36 (shown in FIG. 2) located within or near the positioning devices 18. The global control system 22 is typically connected to the seismic survey vessel's navigation system and obtains estimates of system wide parameters, such as the vessel's towing direction and velocity and current direction and velocity, from the vessel's navigation system.

The global control system 22 monitors the actual positions of each of the positioning devices 18 and is programmed with the desired positions of or the desired minimum separations between the seismic streamers 12. The horizontal positions of the positioning devices 18 can be derived, for instance, using the types of acoustic positioning systems described in commonly assigned U.S. Pat. No. 4,992,990, which is incorporated herein by reference. Alternatively, or additionally, a satellite-based global positioning system can be used to determine the positions of the equipment. The vertical positions of the positioning devices 18 are typically monitored using pressure sensors attached to the positioning devices 18, as discussed below.

The global control system 22 preferably maintains a dynamic model of each of the seismic streamers 12 and utilizes the desired and actual positions of the positioning devices 18 to regularly calculate updated desired vertical and horizontal forces the positioning devices 18 should impart on the seismic streamers 12 and to move them from their actual positions to their desired positions. The global control system 22 preferably calculates the desired vertical and horizontal forces based on the behavior of each streamer 12 and also takes into account the behavior of the complete streamer array. Due to the relatively low sample rate and time delay associated with the horizontal position determination system, the global control system 22 runs position predictor software to estimate the actual locations of each of the positioning devices 18. The global control system 22 also checks the data received from the vessel's navigation system. The global control system 22 will typically acquire the following parameters from the vessel's navigation system: vessel speed (m/s), vessel heading (degrees), current speed (m/s), current heading (degrees), and the location of each of the positioning devices 18 in the horizontal plane in a vessel fixed coordinate system. Current speed and heading can also be estimated based on the average forces acting on the streamers 12 by the positioning devices 18. The global control system 22 will preferably send the following values to the local bird controller: demanded vertical force, demanded horizontal force, towing velocity, and crosscurrent velocity.

Figure 2:
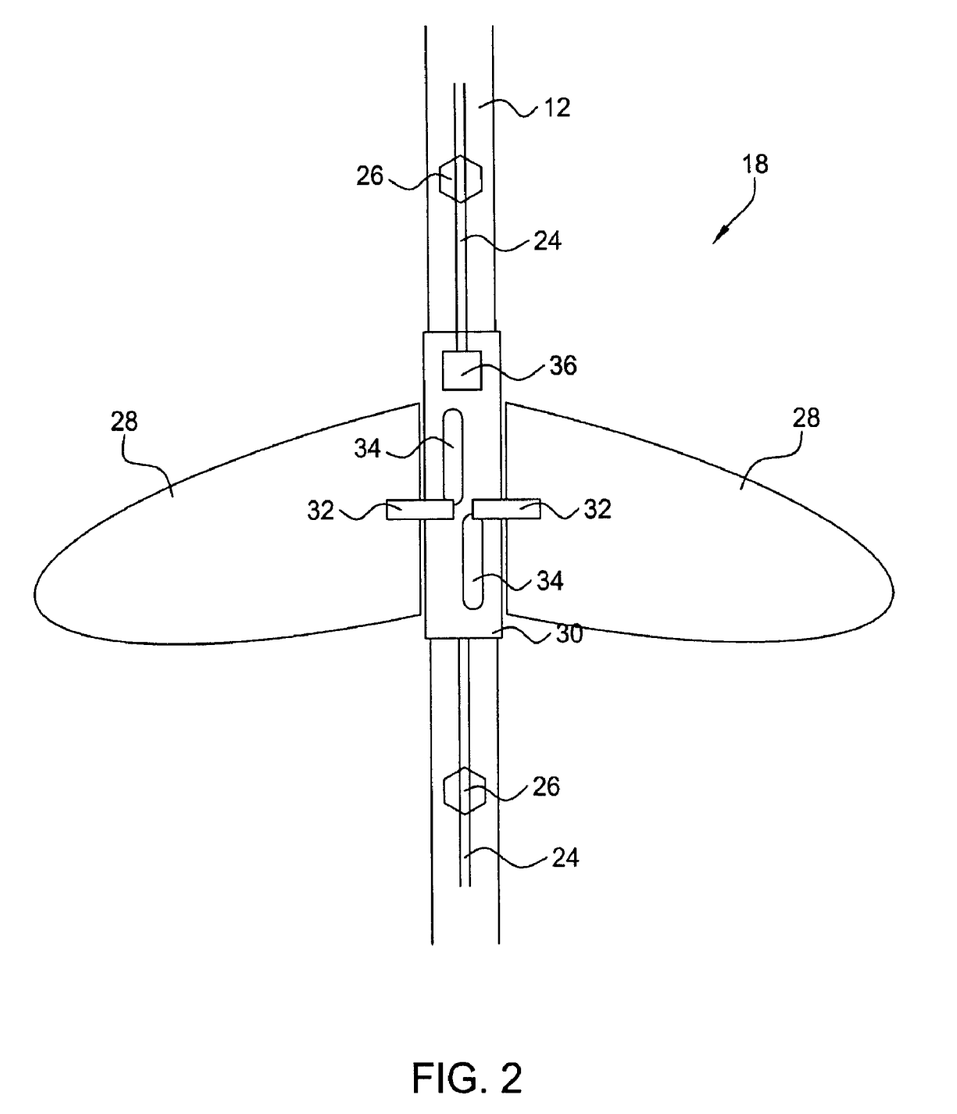
FIG. 2 illustrates a portion of the seismic streamer with an attached positioning device that may be used to acquire seismic data in accordance with one embodiment of the invention.

FIG. 2 illustrates a portion of the seismic streamer 12 with an attached positioning device 18, which is capable of controlling the position of seismic streamer 12 in both the vertical and horizontal directions. The seismic streamer 12 further includes a communication line 24, which may consist of a bundle of fiber optic data transmission cables and power transmission wires. The communication line 24 passes along the length of the seismic streamer 12 and is connected to the seismic sensors (not shown), hydrophones 26, which are distributed along the length of the streamer 12, and to the positioning device 18. The positioning device 18 preferably has a pair of independently moveable wings 28, which are connected to rotatable shafts 32, which are rotatable by wing motors 34. The positioning device 18 allows the orientation of the wings 28 with respect to the positioning device body 30 to be changed.

The wing motors 34 may consist of any type of device that is capable of changing the orientation of the wings 28. The wing motors 34 may either be electric motors or hydraulic actuators. The local control system 36 controls the movement of the wings 28 by calculating a desired change in the angle of the wings 28 and selectively driving the motors 34 to effectuate this change.

One of the benefits of the above referenced control system is that the desired change in the orientation of the wing 28 is calculated using an estimate of the velocity of the positioning device 18 rather than simply relying on a feedback-loop type of control system that operates in the same manner regardless of the vessel speed. Because the force produced by wing 28 is proportional to the velocity of the device squared, a much more precise calculation of the desired change in the wing orientation can be made by using an estimate of the device velocity. As mentioned above, the global control system 22 shares responsibilities with the local control system 36. The global control system 22 is tasked with monitoring the positions of the streamers 12 and providing desired forces or desired position information to the local control system 36. The local control system 36 within each positioning device 18 is tasked with adjusting the wing splay angle to rotate the positioning device 18 to the proper position and for adjusting the wing common angle to produce the magnitude of total desired force required. The positioning devices 18, including the global control system 22 and the local control system 36 are described in more detail in commonly assigned GB/2,342,081, which is incorporated herein by reference. One or more embodiments of the invention also contemplate other designs for the positioning devices 18, including those utilizing one full-moving wing with ailerons, three full-moving wings, four full-moving wings, and those described in commonly assigned U.S. Pat. No. 6,671,223, which is incorporated herein by reference.

With respect to the hydrophones 26, in one embodiment, the hydrophones 26 may not be wired as to form groups that generate a single output. Rather, each hydrophone 26 is set to generate a separate output, which is subsequently filtered by an adaptive beamformer. The adaptive beamformer includes two or more spatially and/or temporally local multichannel adaptive filters with two or more channels. The adaptive beamformer is configured to discriminate its response in accordance with the spatial and/or temporal spectral content of the input signals. In this manner, filtered output signals can be generated and recorded for each hydrophone. The hydrophones 26 may be spaced at intervals of 3.125 meters to attenuate unwanted noise in the received seismic signals. The spacing between the hydrophones 26 may be based on a number of factors, such as available bandwidth for data transmission and recording or manufacturing costs. The spacing between the hydrophones 26 in combination with the adaptive beamformer are configured to reduce unwanted noise, particularly coherent noise, such as bulge wave noise, swell noise, and crossflow noise. The hydrophone configuration and the adaptive beamformer are described in more detail in commonly assigned U.S. Pat. No. 6,684,160, which is incorporated herein by reference.

Figure 3:
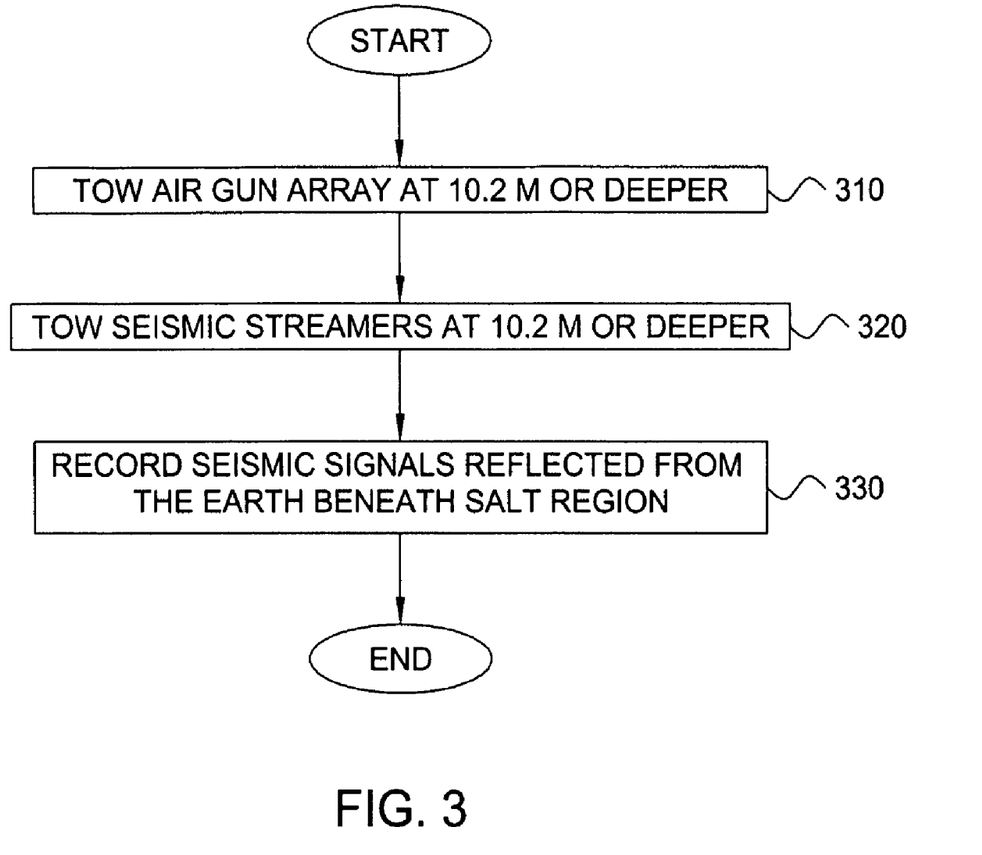
FIG. 3 illustrates a flow diagram of a method for enhancing the acquisition of low frequency seismic signals for sub-salt imaging in accordance with one embodiment of the invention.

FIG. 3 illustrates a flow diagram of a method 300 for enhancing the acquisition of low frequency seismic signals for sub-salt imaging in accordance with one embodiment of the invention. At step 310, the air gun array 14 is towed at 10.2 meters or deeper. In one embodiment, the air gun array 14 may be towed between 10-25 meters deep. By placing the air gun array at such depths, the pass band of the source ghost response migrates to lower frequencies, thereby permitting the low frequency signal to be preserved. Accordingly, the depth of the air gun array 14 may be selected such that the pass zone of the ghost response coincides with a frequency range of the energy generated by the air gun array 14.

At step 320, the seismic streamers 12 are towed at 10.2 meters or deeper. In one embodiment, the seismic streamers 12 may be towed between 10-25 meters deep. By placing the seismic streamers 12 at such depths, the pass band of the streamer ghost response migrates to lower frequencies, thereby permitting the low frequency signal to be preserved. Accordingly, the depth of the seismic streamers 12 may be selected such that the pass zone of the ghost response coincides with a frequency range of the energy generated by the air gun array 14.

At step 330, the seismic signals reflected from strata in the earth beneath the salt region are received by the hydrophones disposed on the seismic streamers 12. During acquisition, a low cut filter is often used to reduce swell noise contamination. However, the low cut filter also removes low frequency signals. In accordance with one embodiment of the invention, the seismic signals are recorded by the hydrophones without any low cut filters or with the low cut filter option turned off. In this manner, the amplitude of the low frequency signals may be enhanced.

Figure 4A:
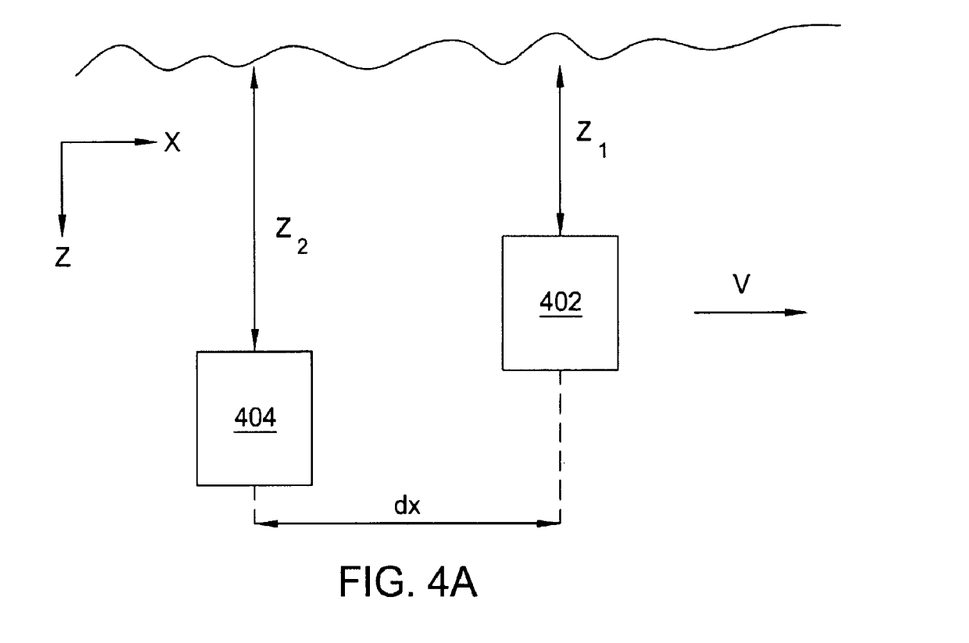
FIG. 4A illustrates a cross sectional view of an air gun array configuration in accordance with one embodiment of the invention.

In accordance with one or more embodiments of the invention, the seismic signals may be acquired using various air gun array and streamer configurations. FIG. 4A illustrates a cross sectional view of an air gun array configuration in accordance with one embodiment of the invention, which includes air gun arrays 402 and 404. Air gun array 402 is configured to enhance high frequency seismic signals, while air gun array 404 is configured to enhance low frequency seismic signals. Air gun array 402 is peak tuned, i.e., air gun array 402 is tuned to the leading peak, while air gun array 404 is bubble tuned, i.e., the air gun array 404 is tuned to the first bubble oscillation. In one embodiment, air gun array 402 may be bubble tuned, while air gun array 404 may be peak tuned. The total volume of air gun array 404 is greater than the total volume of air gun array 402. For example, air gun array 402 has a total volume of 5085 cubic inches, whereas air gun array 404 has a total volume of 6780 cubic inches.

Air gun array 404 is disposed at a greater depth than air gun array 402. For example, air gun array 402 is disposed at a depth between about 6 to 8 meters, while air gun array 404 is disposed at a depth between about 14 to 18 meters. The difference in depth between air gun array 402 and air gun array 404 may be selected such that $1/dt<fmax$, where fmax is the maximum frequency in the seismic data. The time dt is determined by the depth difference between the two emitter arrays and by the velocity of seismic energy in water, which is a known quantity.

In addition to being separated in the vertical direction (z direction), the two air gun arrays are displaced by a horizontal distance dx in the horizontal direction (x direction). The horizontal displacement between the two emitter arrays is substantially equal to the shot point interval of the marine seismic surveying arrangement. As an example, for a seismic surveying arrangement that generates a shot point interval of 37.5 m, the horizontal displacement of the air gun arrays is approximately 37.5 m.

The two air gun arrays, however, are not displaced in the y direction, which extends out of the paper and perpendicular to the direction of movement of the air gun arrays. The seismic survey vessel 10 is configured to tow air gun arrays 402 and 404 at a speed V.

In use, the air gun arrays 402 and 404 are moved through the water in the direction along which the arrays are displaced. The air gun arrays 402 and 404 are fired in a "flip flop" sequence at equal shot point intervals, e.g., 37.5 m. The air guns on the array nearer the seismic survey vessel 10, i.e., air gun array 402, are fired initially. These air guns may be fired consecutively or simultaneously. After a time delay equal to the time required for the towing vessel to travel 37.5 m (i.e., dx/V), the air guns of the air gun array further from the seismic survey vessel 10, i.e., air gun array 404, are fired. The time delay dx/V between the firings of the two air gun arrays ensures that each air gun of one array is fired at the same x and y coordinates as the corresponding air gun of the other array, but at different depths. As such, two shot records are generated at points having the same x and y coordinates, but at different z coordinates (depths). In one embodiment, the air gun arrays 402 and 404 are fired simultaneously using a source encoding technique such that each wavefield is encoded with a signature to indicate the air gun array to which the encoded wavefield is associated. Various encoding techniques are discussed in more detail in commonly assigned U.S. Pat. No. 5,924,049, which is incorporated herein by reference.

Figure 4B:
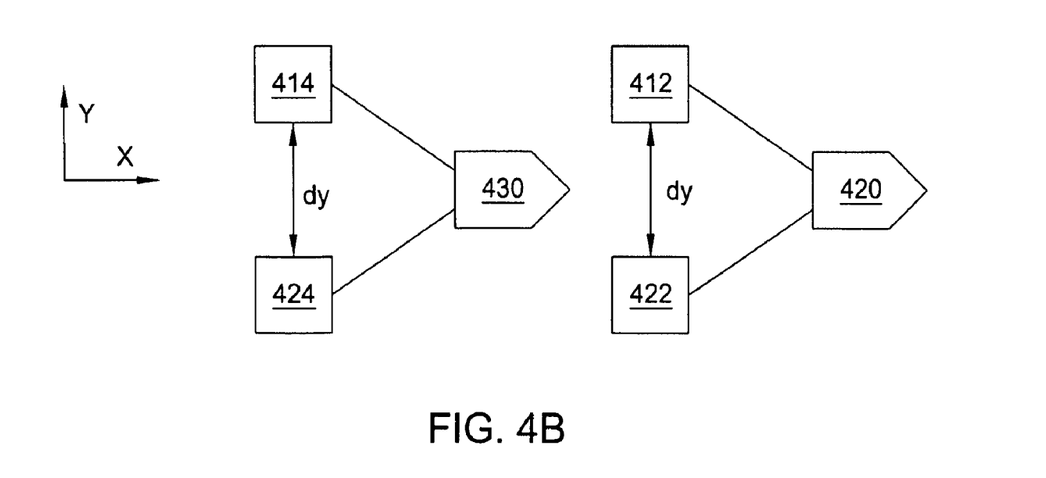
FIG. 4B illustrates a plan view of an air gun array configuration in accordance with another embodiment of the invention.

FIG. 4B illustrates a plan view of an air gun array configuration in accordance with one embodiment of the invention, which includes air gun arrays 412, 422, 414 and 424. Air gun arrays 412 and 422 are towed by seismic survey vessel 420, while air gun arrays 414 and 424 are towed by seismic survey vessel 430. Seismic survey vessel 430 is shown as directly behind seismic survey vessel 420. Seismic survey vessel 430, however, may be positioned anywhere relative to seismic survey vessel 420. For instance, seismic survey vessel 430 may be placed beside seismic survey vessel 420. The two seismic survey vessels may be separated by a distance based on geophysical or survey design considerations, such as an offset range.

Air gun arrays 412 and 422 are configured to enhance high frequency seismic signals, while air gun arrays 414 and 424 are configured to enhance low frequency seismic signals. Air gun arrays 412 and 422 are peak tuned, while air gun arrays 414 and 424 are bubble tuned. In one embodiment, air gun arrays 412 and 422 may be bubble tuned, while air gun arrays 414 and 424 may be peak tuned. The total volume of air gun arrays 414 and 424 are greater than the total volume of air gun arrays 412 and 422. For example, each one of air gun arrays 412 and 422 has a total volume of 5085 cubic inches, whereas each one of air gun arrays 414 and 424 has a total volume of 6780 cubic inches.

Air gun arrays 414 and 424 are disposed at a greater depth than air gun arrays 412 and 422. For example, air gun arrays 412 and 422 may be disposed at a depth of about 6 to 8 meters, while air gun arrays 414 and 424 may be disposed at a depth of about 14 to 18 meters.

Air gun arrays 412 and 422 are separated by a cross line distance dy in the y direction. The cross line distance dy between air gun arrays 412 and 422 depends on the separation between the streamers 12. Preferably, the cross line distance dy is half of the steamer separation. Air gun arrays 412 and 422, however, are not displaced in the x direction. Likewise, air gun arrays 414 and 424 are separated by the same cross line distance dy that separates air gun arrays 412 and 422, and are not displaced in the x direction.

In use, air gun arrays 412, 422, 414 and 424 are fired simultaneously using a source encoding technique such that each wavefield is encoded with a signature to indicate the air gun array with which the encoded wavefield is associated. As mentioned above, various encoding techniques are discussed in more detail in commonly assigned U.S. Pat. No. 5,924,049, which is incorporated herein by reference.

Figure 4C:
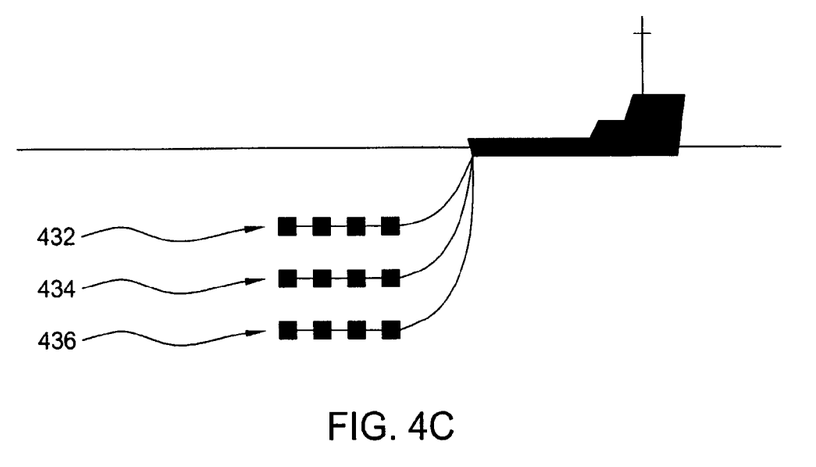
FIG. 4C illustrates a cross sectional view of an air gun array configuration in accordance with yet another embodiment of the invention.

FIG. 4C illustrates a cross sectional view of an air gun array configuration in accordance with one embodiment of the invention, which includes air gun arrays 432, 434 and 436. Air gun arrays 432, 434 and 436 are disposed in the water at three different depths. Air gun array 432 is disposed substantially vertically above air gun array 434, while air gun array 434 is disposed substantially vertically above air gun array 436. In this manner, air gun arrays 432, 434 and 436 have the same x and y coordinates but different z coordinates. This arrangement may be referred to as an over/under combination of the air gun arrays. The term "over" is typically associated with the shallower air gun arrays and the term "under" is typically associated with the deeper air gun arrays. In use, air gun arrays 412, 422, 414 and 424 may be fired in a "flip flop" sequence, or simultaneously using a source encoding technique such that each wavefield is encoded with a signature to indicate the particular air gun array to which the encoded wavefield is associated. Various encoding techniques are discussed in more detail in commonly assigned U.S. Pat. No. 5,924,049, which is incorporated herein by reference.

Figure 4D:
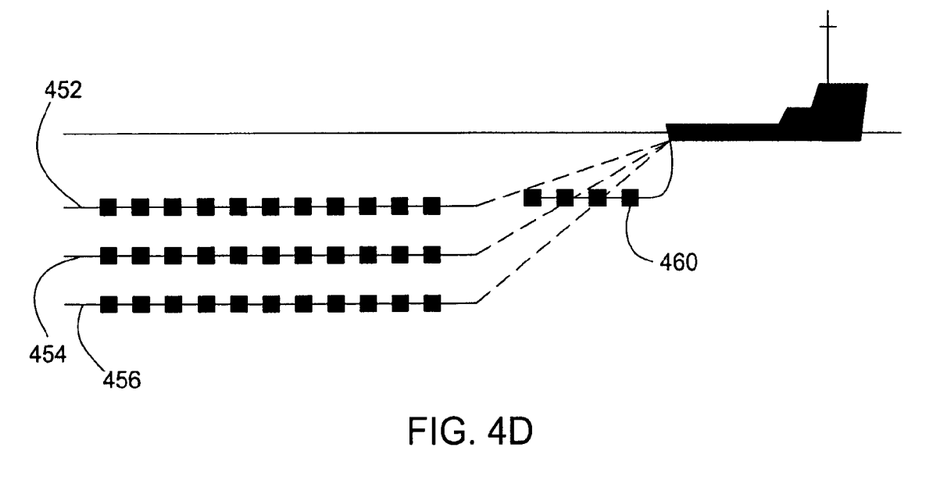
FIG. 4D illustrates a cross sectional view of a seismic streamer configuration in accordance with one embodiment of the invention.

FIG. 4D illustrates a cross sectional view of a seismic streamer configuration in accordance with one embodiment of the invention, which includes seismic streamers 452, 454, 456 and air gun array 460. Seismic streamers 452, 454, 456 are disposed in the water at three different depths. Seismic streamer 452 is disposed substantially vertically above seismic streamer 454, while seismic streamer 454 is disposed substantially vertically above seismic streamer 456. In this manner, seismic streamers 452, 454 and 456 have the same x and y coordinates but different z coordinates. This arrangement may be referred to as an over/under combination of the seismic streamers. The term "over" is typically associated with the shallower seismic streamers and the term "under" is typically associated with the deeper seismic streamers. Although only one air gun array is shown to operate in connection with seismic streamers 452, 454 and 456, one or more embodiments of the invention contemplate seismic streamers 452, 454 and 456 to operate with various air gun array configurations, such as those described with reference to FIGS. 4A, 4B and 4C.

Figure 5:
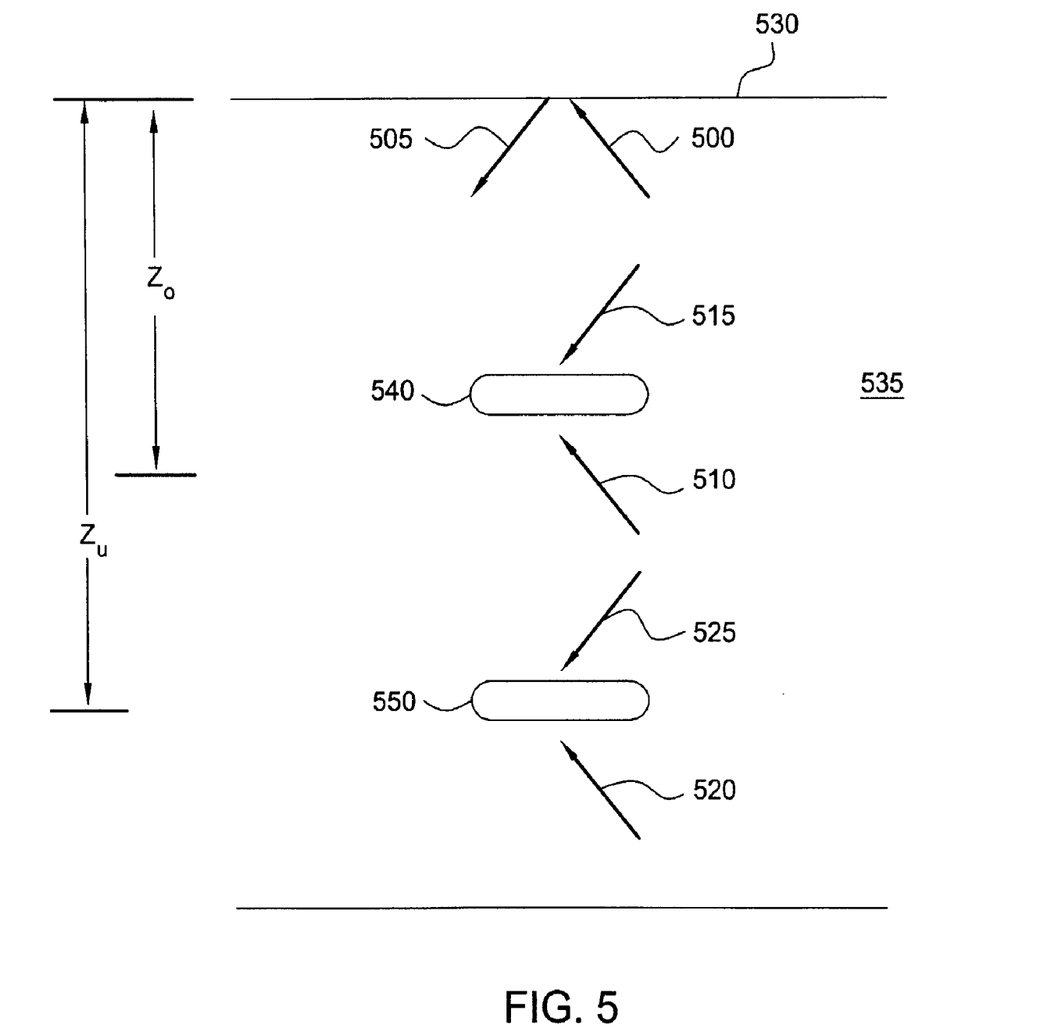
FIG. 5 illustrates up-going and down-going wave fields corresponding to at least one provided acoustic signal, or shot, in a marine seismic survey that may be used in connection with one embodiment of the invention.

FIG. 5 illustrates up-going and down-going wave fields 500, 505, 510, 515, 520, 525 corresponding to at least one provided acoustic signal, or shot, in a marine seismic survey. Although the up-going and down-going wave fields are discussed as if they are separate entities, persons of ordinary skill in the art should appreciate that the up-going and down-going wave fields 500, 505, 510, 515, 520, 525 may represent portions of a single wave field produced by a single shot or portions of a plurality of wave fields produced by a plurality of shots.

An "over" seismic sensor 540 is deployed at a depth $Z_o$ beneath a surface 530 of a body of water 535 and an "under" seismic sensor 550 is deployed at a depth $Z_u$ beneath the surface 530. The "over" seismic sensor 540 detects one or more physical quantities indicative of the up-going and down-going wave fields 510, 515. In one embodiment, the "over" seismic sensor 540 detects a pressure wave field $P(Z_o)$ at the location of the "over" seismic sensor 540. The "under" seismic sensor 550 detects one or more physical quantities indicative of the up-going and down-going wave fields 520, 525. In one embodiment, the "under" seismic sensor 550 detects a pressure wave field $P(Z_u)$ at the location of the "under" seismic sensor 550.

The up-going wave field 520 at the "under" seismic sensor 550, represented by $U(Z_u)$, can be related to the pressure wave fields $P(Z_o)$ at the location of the "over" seismic sensor 540 and $P(Z_u)$ at the location of the "under" seismic sensor 550 by the expression:

$$U(Z_u) = \frac{W_D P(Z_u) - P(Z_o)}{W_D - W_U},$$

where $W_D$ and $W_U$ are wave field extrapolator operators for the down-going and up-going wave fields, respectively. Similarly, the down-going wave field 525 at the "under" seismic sensor 550, represented by $D(Z_u)$, can be related to the pressure wave fields $P(Z_o)$ and $P(Z_u)$ by the expression:

$$D(Z_u) = \frac{P(Z_o) - W_U P(Z_u)}{W_D - W_U}.$$

In one embodiment, the wave field extrapolator operator $W_U$ is given by the expression:

$$W_U = e^{-j2\pi f \sqrt{1-k^2 v^2/f^2}(Z_o - Z_u)}$$

and the wave field extrapolator operator $W_D$ is given by the expression:

$$W_D = e^{-j2\pi f \sqrt{1-k^2 v^2/f^2}(Z_u - Z_o)},$$

where v is the water velocity, f is the wave frequency, and k is the wave number. Persons of ordinary skill in the art should appreciate that the expression for the wave field extrapolator operator $W_U$ is only valid for non-evanescent waves, i.e. $1-k^2v^2/f^2>0$. Persons of ordinary skill in the art should also appreciate that similar expressions may be derived to relate the up-going and down-going wave fields 510, 515 at the "over" seismic sensor 540 to the pressure wave fields $P(Z_o)$ and $P(Z_u)$.

The up-going wave field 500 just beneath the surface 530 is given by the expression:

$$U(0) = U(Z_u) e^{-j2\pi f \sqrt{1-k^2 v^2/f^2}(Z_u)},$$

and the down-going wave field 505 just beneath the surface 530 is given by the expression:

$$D(0) = D(Z_u) e^{-j2\pi f \sqrt{1-k^2 v^2/f^2}(Z_u)}.$$

The above expressions for the up-going and down-going wave fields 500, 505 assume that the surface 530 is at Z=0.

If the surface 530 is assumed to be perfectly calm, a circumstance that is virtually never achieved in practice, then the up-going and the down-going wave fields 500, 505 at the surface 530 are equal in absolute value and have opposite signs. In mathematical terms, the surface 530 is considered a free surface at which a pressure wave field vanishes, i.e. P(Z=0)=0, so that the up-going and down-going wave fields 500, 505 are related by a flat sea boundary condition:

$$P(Z=0) = U(0) + D(0) = 0$$

By imposing the flat sea boundary condition in the form U(0)=−D(0), i.e. a surface reflectivity of −1, for a data window below a direct arrival, the following expression may be derived:

$$P(Z_o)\left[e^{j2\pi f \sqrt{1-k^2v^2/f^2}\, Z_u}\left(1 - e^{-j2\pi f \sqrt{1-k^2v^2/f^2}\, Z_u}\right)\right] =$$
$$P(Z_u)\left[e^{j2\pi f \sqrt{1-k^2v^2/f^2}\, Z_o}\left(1 - e^{-j2\pi f \sqrt{1-k^2v^2/f^2}\, Z_o}\right)\right].$$

Persons of ordinary skill in the art should appreciate that the expressions in brackets are ghost operators, $F_O$ and $F_U$, for the over and under seismic data, respectively, in the case of a perfectly calm surface 530. Accordingly, the above expression states that the pressure at the "over" seismic receiver 540 multiplied by the ghost operator $F_U$ of the "under" seismic receiver 550 is equal to the pressure at the "under" seismic receiver 550 multiplied by the ghost operator $F_O$ of the "over" seismic receiver 540. In mathematical terms, the above expression may be written in the simplified form: $P(Z_o)F_O = P(Z_u)F_U$.

However, as discussed above, the surface 530 is virtually never flat, as assumed above and in conventional practice. Moreover, the above expressions do not account for temporal and spatial variations in the water velocity, reflectivity of the surface 530, streamer positioning errors, and other non-ideal conditions that are frequently encountered in real marine seismic surveys. To account, at least in part, for the effects of the aforementioned non-ideal conditions, one or more calibration filters are determined in a manner that will be discussed in detail below. The calibration filters are then used to form an over/under combination of marine seismic data acquired by the "over" seismic receiver 540 and the "under" seismic receiver 550. For example, the over/under combination may be formed by modifying the surface boundary condition using the one or more calibration filters. The over/under combination formed with the modified boundary condition may result in a combined data set with reduced noise relative to a data set formed by an over/under combination using the flat sea boundary condition.

Figure 6:
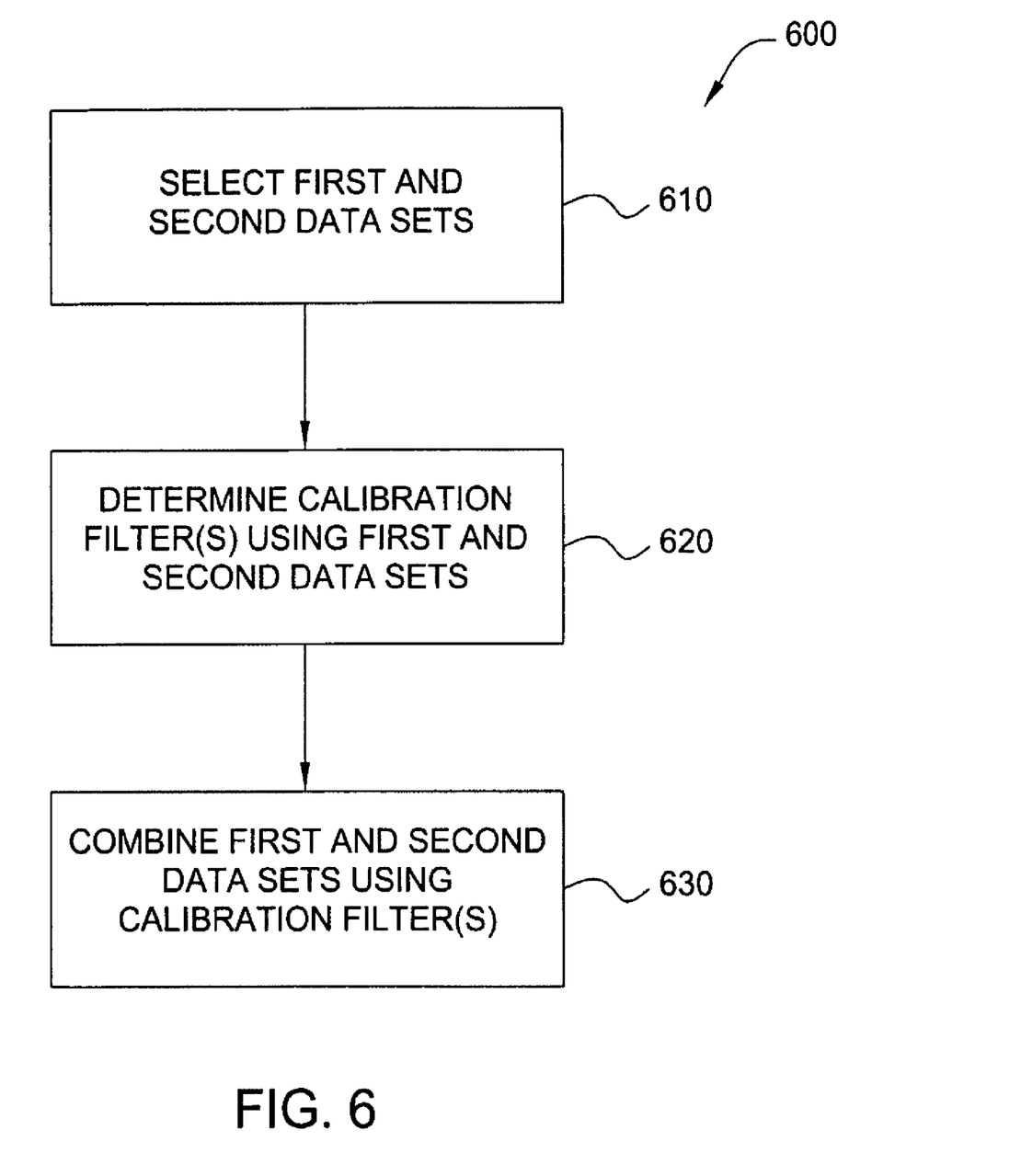
FIG. 6 illustrates a flow diagram of a method for forming an over/under combination using one or more calibration filters that may be used in connection with one or more embodiments of the invention.

FIG. 6 illustrates a flow diagram of a method 600 for forming an over/under combination using one or more calibration filters in accordance with one or more embodiments of the invention. First and second data sets are selected (at 610). In one embodiment, the first and second data sets are selected (at 610) to be pre-stack over and under data sets acquired by at least one seismic sensor coupled to an "over" streamer and at least one seismic sensor coupled to an "under" streamer in an over/under streamer combination. However, the present invention is not limited to selecting (at 610) all of the data in the pre-stack data set. In one alternative embodiment, portions of the pre-stacked data set acquired within a selected time window and/or a selected offset may be selected (at 610). In another alternative embodiment, portions of the pre-stacked data set from a selected gather, such as a shot gather and/or a receiver gather, may be selected (at 610).

The first and/or second data sets may be provided via transmission over a wired and/or wireless medium. For instance, the over and under data sets may be selected from the data as it is gathered, or shortly after it is collected, from a seismic survey. Alternatively, the first and/or second data sets may be recorded on and transmitted via recording tape, magnetic disks, compact disks, DVDs, and the like. Thus, the first and second data sets can, in some embodiments, can be selected from data previously collected and archived on some magnetic or optical storage medium.

One or more calibration filters are determined (at 620) using the selected over and under data sets. In one embodiment, the one or more calibration filters are determined (at 620) by initially assuming, as discussed above, the pressure at the "over" seismic receiver 440 multiplied by the ghost operator $F_U$ of the "under" seismic receiver 450 is equal to the pressure at the "under" seismic receiver 450 multiplied by the ghost operator $F_O$ of the "over" seismic receiver 440, i.e. $P(Z_o)F_O=P(Z_u)F_U$. This technique is often referred to as across-ghosting technique.

However, as discussed above, this relationship generally is not precise for the acquired over/under seismic data. The one or more calibration filters, a(f), may therefore be determined using the expression $a(f)P(Z_o)F_O=P(Z_u)F_U$. For example, the one or more calibration filters may be determined by evaluating the expression $a(f)P(Z_o)F_O=P(Z_u)F_U$ by a least-squares criterion. However, persons of ordinary skill in the art should appreciate that the present invention is not limited to applying the least-squares criterion to the expression $a(f)P(Z_o)F_O=P(Z_u)F_U$. Further, any desirable expression may be evaluated with any desirable technique used to determine the calibration filters. Persons of ordinary skill in the art should also appreciate that the one or more calibration filters may be determined such that the expression $a(f)P(Z_o)F_O=P(Z_u)F_U$ holds true in a statistical sense, even though it may not hold precisely for all the acquired seismic data used to determine the calibration filters.

The one more calibration filters are then used to combine (at 630) the first and second data sets to form a third data set, such as an over/under combined data set. The one or more calibration filters may be used to define a perturbed boundary condition using over and under data sets. The perturbed boundary condition is then incorporated into a selected over/under combination technique that is used to combine (at 630) the over and under seismic data. Persons of ordinary skill in the art should appreciate that the present invention is not limited to any particular technique for combining (at 630) the over and under seismic data using the one or more calibration filters. In various alternative embodiments, any desirable technique for combining (at 630) the over and under seismic data using the one or more calibration filters may be used.

While the foregoing is directed to embodiments of the present invention, other and further embodiments of the invention may be devised without departing from the basic scope thereof, and the scope thereof is determined by the claims that follow.

The invention claimed is:

1. A method for acquiring seismic signals, comprising:
   towing a first air gun array in the water at a first depth and a second air gun array in the water at a second depth greater than the first depth, wherein one of the first depth is at least 10 meters;
   directing acoustic signals with the first air gun array and the second gun array down through the water into the earth beneath a salt region;
   towing one or more seismic streamers in the water at one or more third depths, wherein at least one of the third depths is at least 10 meters, wherein each streamer comprises a plurality of hydrophones disposed therealong; and
   recording with the hydrophones a plurality of seismic signals reflected from strata in the earth beneath the salt region.

2. The method of claim 1, wherein each air gun array comprises a total volume of at least 6000 cubic inches.

3. The method of claim 1, wherein each air gun array comprises a total volume ranging from about 6780 cubic inches to about 10,170 cubic inches.

4. The method of claim 1, further comprising tuning the first air gun array and the second gun array to a first bubble oscillation.

5. The method of claim 1, wherein each streamer comprises one or more positioning devices disposed therealong, wherein each positioning device comprises a first wing and a second wing, wherein the first wing and the second wing being independently moveable to steer the positioning device laterally and vertically.

6. The method of claim 1, wherein the hydrophones are spaced at intervals from about 2.0 meters to about 3.30 meters.

7. The method of claim 1, further comprising:
   digitizing an output of each hydrophone separately; and
   filtering the output to generate a seismic signal with a reduced noise content.

8. The method of claim 1, wherein recording with the hydrophones comprises recording the seismic signals without a low cut filter.

9. The method of claim 1, wherein the first air gun array is tuned to a leading peak and the second air gun array is tuned to a first bubble oscillation.

10. The method of claim 1, wherein the first air gun array has a total volume of about 5085 cubic inches and the second air gun array has a total volume of about 6780 cubic inches.

11. The method of claim 1, wherein the first air gun array is separated from the second air gun array by a distance substantially equal to a shot point interval.

12. The method of claim 1, wherein the first air gun array is separated from the second air gun array by about 37.5 meters.

13. The method of claim 1, wherein the first and second air gun arrays are towed at a speed V in an x direction, wherein the first air gun array is separated from the second air gun array by a distance dx in the x direction, wherein the first air gun array is disposed closer to a seismic survey vessel than the second air gun array, wherein the first and second air gun arrays are towed by the seismic survey vessel; and further comprises: firing the first air gun array; and firing the second air gun array at a time dx/V after the first air gun array is fired.

14. The method of claim 1, further comprising firing the first and second air gun arrays sequentially.

15. The method of claim 1, further comprising firing the first and second air gun arrays simultaneously.

16. The method of claim 1, further comprising:
   towing a third air gun array at the first depth; and towing a fourth air gun array at the second depth.

17. The method of claim 16, wherein the first and third air gun arrays are tuned to a leading peak and the second and fourth air gun arrays are tuned to a first bubble oscillation.

18. The method of claim 16, wherein each one of the first and third air gun arrays has a total volume less than the total volume of each one of the second and fourth air gun arrays.

19. The method of claim 16, wherein the first and third air gun arrays are separated by a cross line distance that depends on a streamer separation.

20. The method of claim 16, wherein the second and fourth air gun arrays are separated by a cross line distance that depends on a streamer separation.

21. The method of claim 16, further comprising firing the first, second, third and fourth air gun arrays simultaneously to generate a plurality of wavefields, wherein each wavefield is encoded with a signature indicating the air gun array with which the wavefield is associated.

22. The method of claim 1, wherein each one of the air gun arrays is disposed on a different z coordinate and substantially the same x and y coordinates.

23. The method of claim 1, wherein each one of the seismic streamers is disposed on a different z coordinate and substantially the same x and y coordinates.

24. The method of claim 1, further comprising determining a source signature of the first and second air gun arrays.

25. The method of claim 24, wherein determining the source signature comprises:
   measuring an emitted pressure wave in a near field of the first and second air gun arrays at n independent points whose positions are known with respect to one or more air guns contained within each air gun array;
   constructing at least notionally an equivalent array of n non-interacting independent sources having n equivalent signatures which are superposable to provide the source signature of the first and second air gun arrays; and
   superposing the n equivalent signatures.

26. A method for acquiring a plurality of seismic signals from beneath a salt region in the earth, comprising:
   tuning a first air gun array to a first bubble oscillation;
   towing the first air gun array in the water at a first depth of at least 10 meters wherein the air gun array has a total volume in a range of about 6780 cubic inches to about 10,170 cubic inches;
   towing a second air gun array in the water at a second depth greater than the first depth;
   directing acoustic signals with the first and second air gun arrays down through the water into the earth beneath the salt region;
   towing one or more seismic streamers in the water at one or more third depths, wherein at least one of the third depths is at least 10 meters, wherein each streamer comprises a plurality of hydrophones disposed therealong; and
   recording with the hydrophones the seismic signals reflected from strata in the earth beneath the salt region.

* * * * *